E. R. SEXTONE.
METHOD OF REPRODUCING OUTLINES OF A FORM.
APPLICATION FILED JAN. 12, 1910.
968,272.
Patented Aug. 23, 1910.
Fig. 1.
Fig. 2.
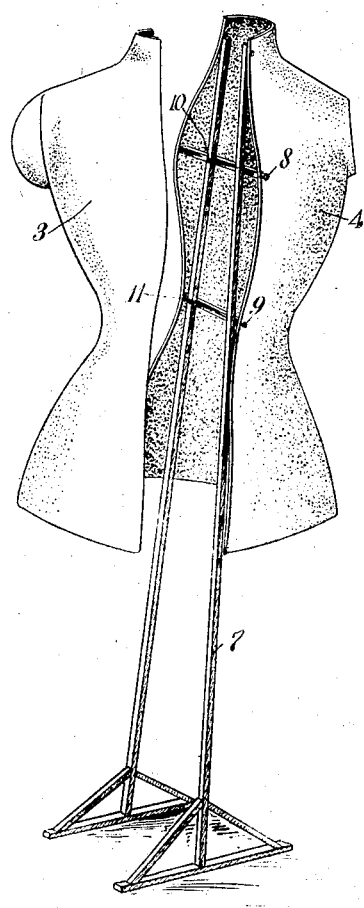
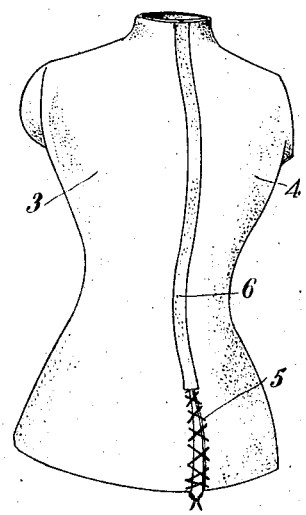
Fig. 3.
WITNESSES:
Geo. W. Naylor
Walton Harrison
INVENTOR
Edith R. Sextone
BY Munn & Co.
ATTORNEYS

UNITED STATES PATENT OFFICE.

EDITH RAY SEXTONE, OF GRENOLA, KANSAS.

METHOD OF REPRODUCING OUTLINES OF A FORM.

968,272.

Specification of Letters Patent. Patented Aug. 23, 1910.

Application filed January 12, 1910. Serial No. 537,640.

*To all whom it may concern:*

Be it known that I, EDITH R. SEXTONE, a citizen of the United States, and a resident of Grenola, in the county of Elk and State of Kansas, have invented a new and Improved Method of Reproducing Outlines of a Form, of which the following is a full, clear, and exact description.

My invention relates to a method for reproducing the outlines of a form, my more particular purpose being to provide a form mold for defining the shape of a bust, and further relates to means for faithfully preserving the outlines of the form and fixing said outlines in said bust.

I mix together one-half ounce of corn starch, fifty-three grains of powdered alum, and ten ounces of plaster of paris of the best quality, the so-called "dental plaster of paris". These substances being thoroughly commingled, preferably by sifting, may be kept for a considerable length of time in a dry, warm place. The mixture has the form of a powder. When it is needed it is scalded with one-half pint of water, applied while boiling violently. The mixture and the water are then stirred rapidly until a smooth, light, spongy paste is made. A vest having been previously applied to the form of the person and neatly fitted thereupon, the paste is now applied to this vest by aid of the hands and is well rubbed into the pores of the cloth. This paste sets rapidly and is harder than paste made of plaster of paris alone. It adheres well to the cloth while being applied. After the paste sets, the vest is cut open at the front and back and removed from the person. The two halves of the casting thus formed are an exact reproduction of the form against which they have been shaped. After the two halves have been removed, they are placed upon specially prepared frames and there remain until their drying is complete. After this they are remeasured, joined together at the front and back and are reinforced with a coating of paste and cloth, coarse paper, rubber, paint, or the like. This completes the work and furnishes a practically perfect reproduction of the outlines of the person. If desired, in making the paste the starch and alum can be scalded separately and then mixed with the plaster of paris.

Reference is to be had to the accompanying drawings forming a part of this specification, in which similar characters of reference indicate corresponding parts in all the figures.

Figure 1 is a perspective showing the form mold at the stage when its two halves are mounted upon the frame; Fig. 2 is a perspective of the complete mold; and Fig. 3 is a fragmentary section showing the lacing.

A vest originally made as a unit is here shown in halves 3, 4. This vest before being made into halves is fitted neatly upon a wearer's person, so as to conform, as near as practicable, to the human figure. This being done, the paste above described, prepared as stated, is applied and allowed to set. After this the vest is split open back and front, thereby being divided into the two halves 3, 4 shown. The two halves are next fitted together upon a frame 7 and provided with lacing 5 whereby the halves are securely held together. After this a strip 6 may be applied in order to cover up the lacing. The form mold thus made is held upon the frame by aid of pins or tacks 8, 9, 10, 11. An outer coating, such as paper or paint, is next added, if desired, and then the frame is removed. This is done by withdrawing the pins 8, 9, 10, 11 and leaves the form complete.

Having thus described my invention, I claim as new and desire to secure by Letters Patent:

1. The method herein described, of reproducing the outlines of a form, which consists in covering said form with a vest, applying to said vest a hardening composition for the purpose of fixing said vest rigidly in accordance with the shape of said form, dividing said vest, removing it in pieces from said form, placing said pieces together, and mounting said pieces upon a display frame.

2. The method herein described, of reproducing the outlines of a form, which consists in covering said form with a vest, applying to said vest a hardening composition, dividing said vest, removing it in pieces from said form, re-uniting said pieces and supporting said pieces by a frame extending thereinto, said frame being provided with portions engaging the interior of said pieces.

3. The method herein described, of reproducing the outlines of a form, which consists in covering the form with a vest, applying to said vest a hardening composition for the purpose of fixing said vest rigidly in accordance with the shape of said form, dividing said vest into distinct parts, removing said parts, re-uniting said parts and
5 extending into said parts a frame for supporting said parts thus re-united.

In testimony whereof I have signed my name to this specification in the presence of two subscribing witnesses.

EDITH RAY SEXTONE.

Witnesses:
    ELISABETH RAY,
    T. H. LOYSDON.